United States Patent
Choi et al.

(10) Patent No.: US 6,788,645 B2
(45) Date of Patent: Sep. 7, 2004

(54) DISK CARTRIDGE

(75) Inventors: Han-kook Choi, Suwon-si (JP);
Yong-hoon Lee, Suwon-si (JP);
Chong-sam Chung, Suwon-si (JP);
Heui-jong Kang, Yongin-si (JP)

(73) Assignee: Samsung Electronics Co., Ltd., Kyungki-do (KR)

( * ) Notice: Subject to any disclaimer, the term of this patent is extended or adjusted under 35 U.S.C. 154(b) by 176 days.

(21) Appl. No.: 10/077,959

(22) Filed: Feb. 20, 2002

(65) Prior Publication Data

US 2003/0031117 A1 Feb. 13, 2003

(30) Foreign Application Priority Data

Aug. 11, 2001 (KR) ........................................ 2001-48523

(51) Int. Cl.[7] .............................. G11B 23/03; G11B 3/70
(52) U.S. Cl. ...................................... 369/291; 360/133
(58) Field of Search ........................ 360/133; 369/291; 206/308.1, 308.2, 308.3, 387.11

(56) References Cited

U.S. PATENT DOCUMENTS 4,807,079 A * 2/1989 Takahashi ................... 360/133

FOREIGN PATENT DOCUMENTS

| JP | 5-303866 | 11/1993 |
|----|----------|---------|
| JP | 11-238339 | 8/1999 |
| JP | 55-111282 | 1/2000 |

* cited by examiner

*Primary Examiner*—David Davis
(74) *Attorney, Agent, or Firm*—Staas & Halsey LLP

(57) ABSTRACT

A disk cartridge includes a case which contains a disk, and a shutter which opens/closes at least one opening formed in the case. The shutter is configured to be foldable around upper and lower surfaces of the case, and slides on the upper and lower surfaces of the case to open/close the opening. Since the shutter opens/closes the opening while being folded around the upper and lower surfaces of the case, a movable distance of the shutter for opening/closing the opening can be fully accommodated even though the size of the disk cartridge is reduced. In addition, applying the configuration of the shutter to a double-sided disk cartridge prevents an inflow of dust from entering into the double-sided disk cartridge since the shutter closes an opening, which is not in use, during a recording/reproducing operation.

25 Claims, 7 Drawing Sheets

DISK CARTRIDGE

CROSS-REFERENCE TO RELATED APPLICATIONS

This application claims the benefit of Korean Application No. 2001-48523, filed Aug. 11, 2001, in the Korean Industrial Property Office, the disclosure of which is incorporated herein by reference.

BACKGROUND OF THE INVENTION

1. Field of the Invention

The present invention relates to a disk cartridge for containing a disk, which is an information recording/reproducing medium, and more particularly, to a disk cartridge with an improved opening/closing structure so as to maintain an opening with a conventional width for a pick-up while reducing the overall size of the disk cartridge.

2. Description of the Related Art

FIGS. 1 and 2 show a conventional disk cartridge 10, which contains a disk D to be used in a recording/reproducing apparatus 100, comprising a case having upper and lower portions 11 and 12 which provide an internal space for the disk D, and a shutter 13 which selectively opens and closes an opening 12a formed through the lower portion 12 of the case so as to allow a pick-up 130 of the recording/reproducing apparatus 100 to access the disk D. An opening lever 150 installed at a cover 101 of the recording/reproducing apparatus 100 is used to open and close the shutter 13.

FIGS. 3A and 3B show that as the disk cartridge 10 seated on a tray 140 (FIG. 1) moves into the recording/reproducing apparatus 100 (FIG. 1), one end of the opening lever 150 pivots and opens the shutter 13 while the one end engages with an engagement portion 13a. A spring 151 restores the opening lever 150 to an original position when the cartridge 10 is ejected from the recording/reproducing apparatus 100 (FIG. 1).

In recent times, the size of a disk is being gradually reduced while raising the recording density of the disk. In addition, an apparatus for recording/reproducing data on a disk is also getting smaller. Therefore, there is a need for a smaller disk cartridge for containing a disk. However, as shown in FIG. 2, a width Wb of the opening 12a for the pick-up 130 (FIG. 1) to have access to the disk D, and reserved spaces Wc for opening/closing operations of the shutter 13 are required to be included in determining an overall width Wa of the disk cartridge 10. These parameters, in effect, predetermine the size of the disk cartridge 10. Consequently, when a width of the shutter 13 and the width Wb of the opening 12a are nearly the same, the overall width Wa of the disk cartridge 10 must be at least 3 times the width Wb of the opening 12a. Reducing the width Wb of the opening 12a to reduce the size of the disk cartridge 10 is undesirable because the opening 12a must allow a turntable 110 (FIG. 1) and the pick-up 130 (FIG. 1) to have access to the disk D. That is, if a disk cartridge is not intended to be used only in a special recording/reproducing apparatus employing a very small pick-up, a width allowing the general-sized pick-up 130 (FIG. 1) and the turntable 110 (FIG. 1) to have access to the disk D must be maintained such that the disk cartridge is compatible with general recording/reproducing apparatuses.

Therefore, there is a need for a disk cartridge having a new structure capable of reducing the overall size of the disk cartridge without reducing the size of an opening for a pick-up.

SUMMARY OF THE INVENTION

Accordingly, it is an objective of the present invention to provide an improved disk cartridge structure capable of effectively reducing the overall size of the disk cartridge while maintaining the size of an opening of the disk cartridge.

Additional objects and advantages of the invention will be set forth in part in the description which follows and, in part, will be obvious from the description, or may be learned by practice of the invention.

To achieve the above and other objects of the present invention, there is provided a disk cartridge including a case which contains a disk and a shutter which opens/closes at least one opening formed in the case, wherein the shutter is configured to be folded around both surfaces of the case, and to be slidable on the both surfaces.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
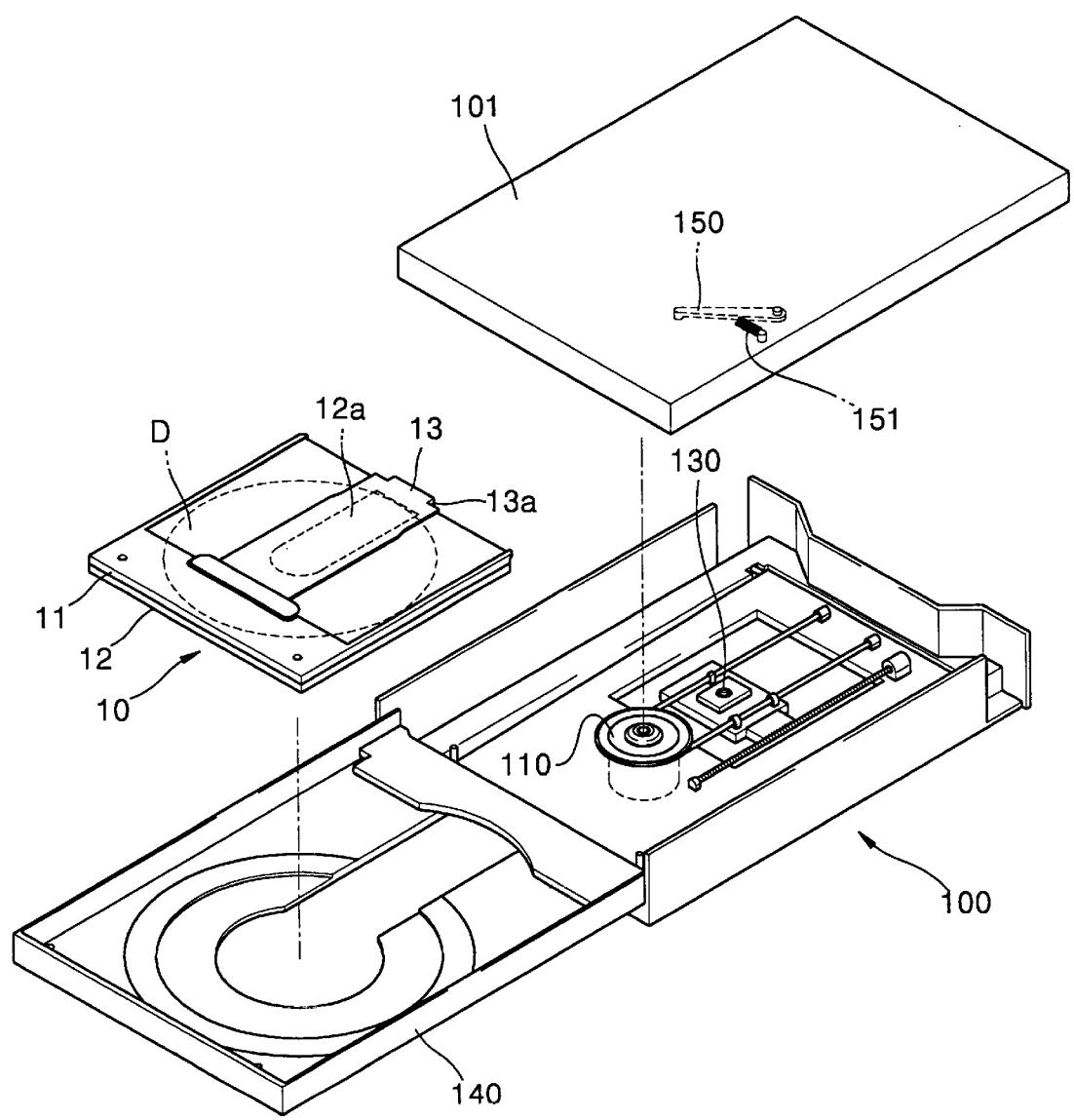
FIG. 1 is a perspective view illustrating a conventional disk cartridge to be inserted into a recording/reproducing apparatus.
Figure 2:
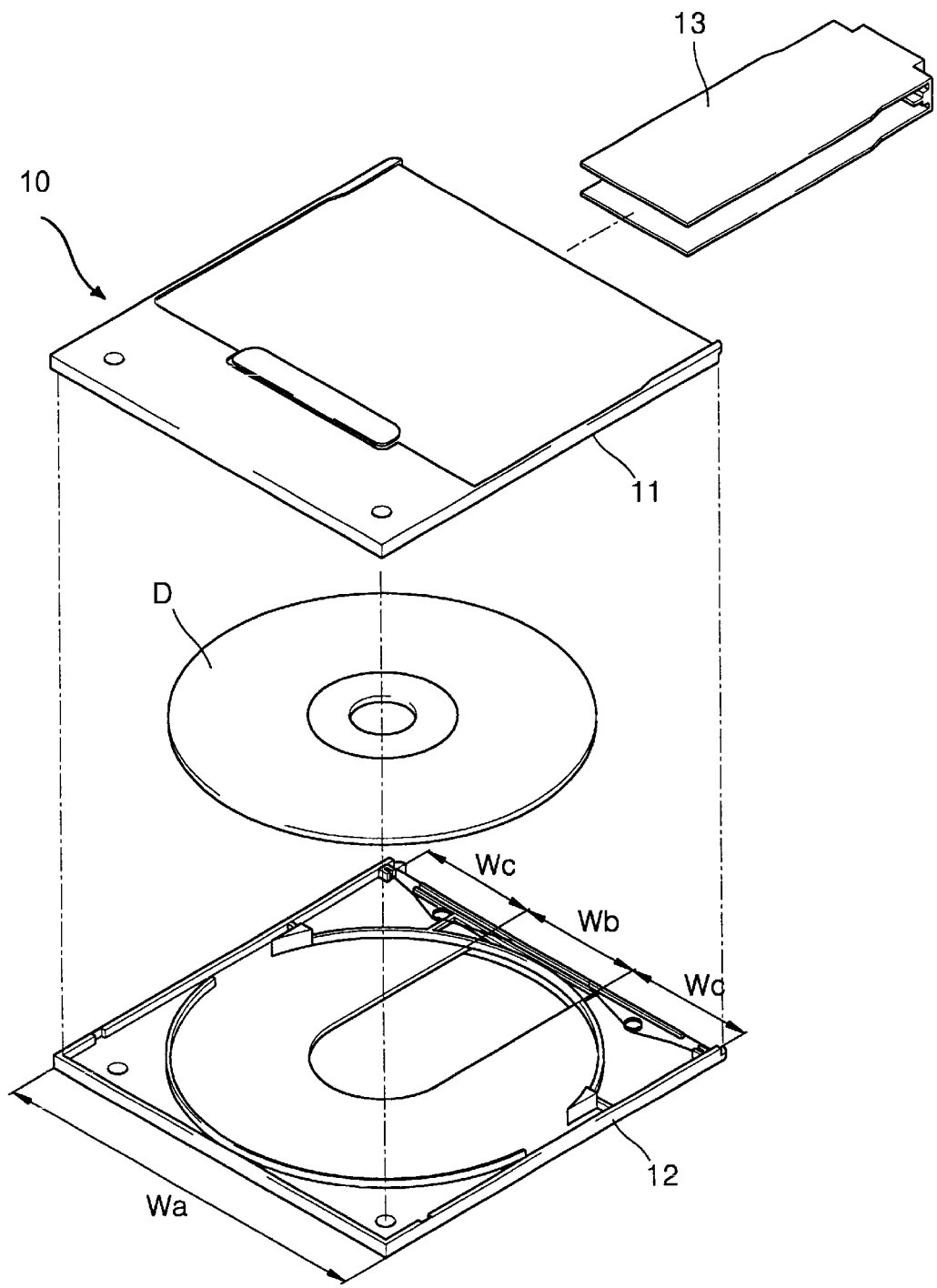
FIG. 2 is an exploded perspective view illustrating the disk cartridge shown in FIG. 1.
Figure 3A:
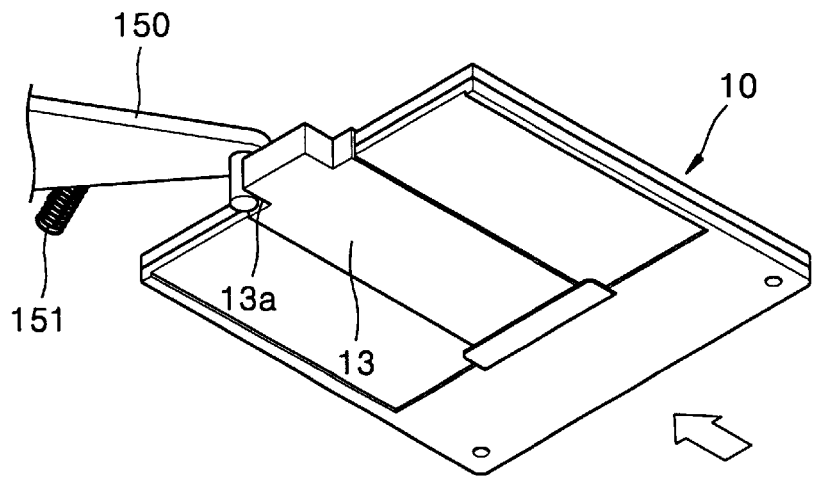
FIGS. 3A and 3B are perspective views illustrating a procedure of opening a shutter of the disk cartridge shown in FIG. 1.
Figure 3B:
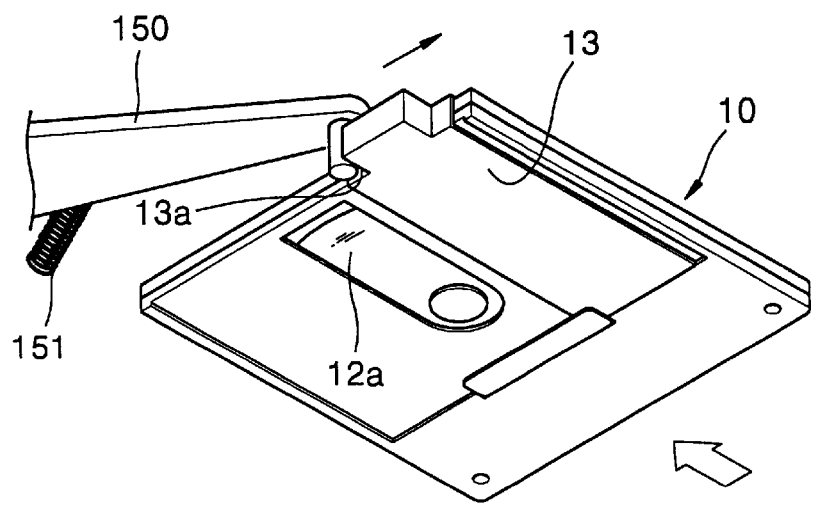

Reference will now be made in detail to the present preferred embodiments of the present invention, examples of which are illustrated in the accompanying drawings, wherein like reference numerals to like elements throughout.

Figure 4:
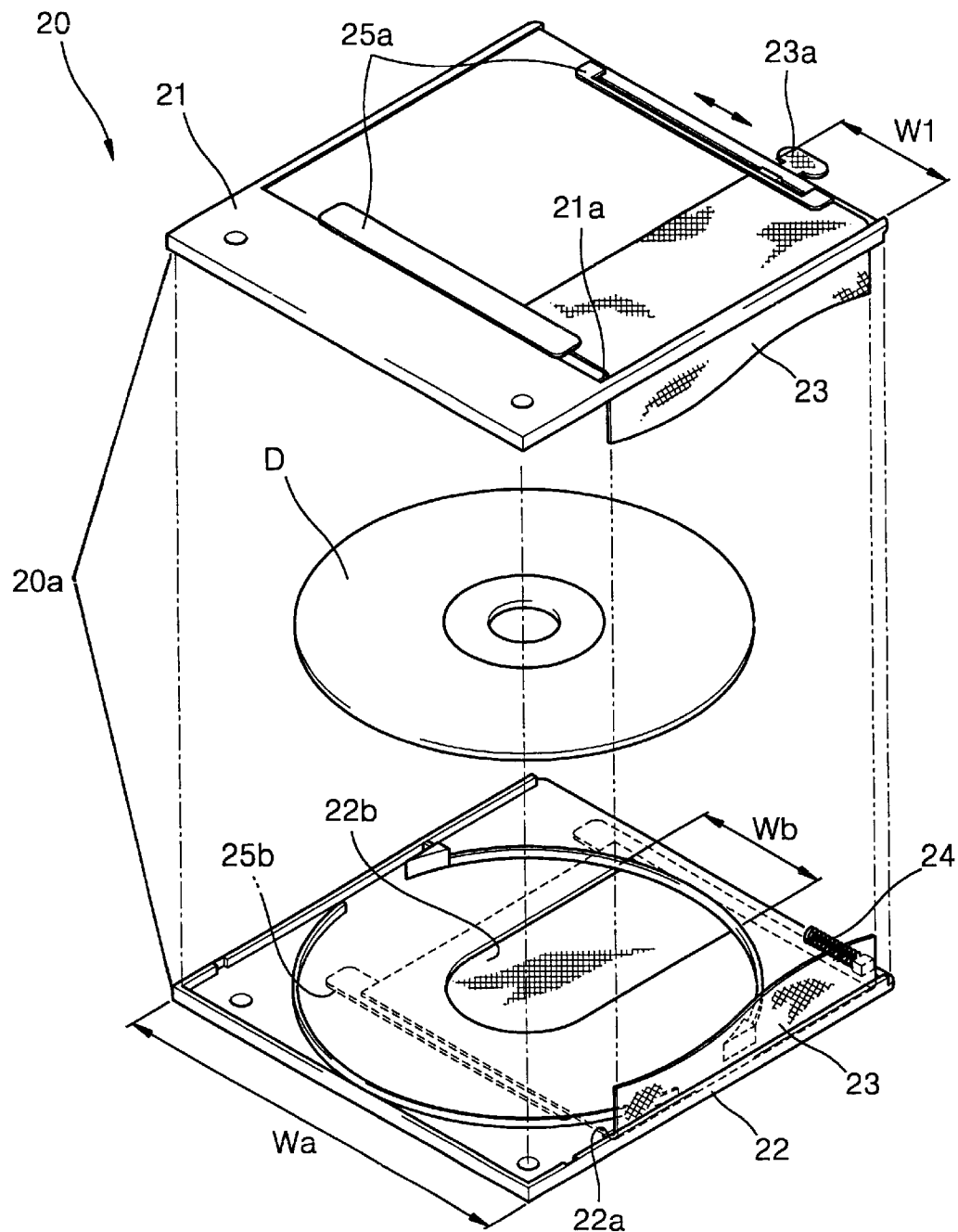
FIG. 4 is an exploded perspective view illustrating a disk cartridge according to an embodiment of the present invention.

FIG. 4 shows a disk cartridge 20 including a case 20a having upper and lower portions 21 and 22 which form an internal space to receive a disk D, and a shutter 23 which selectively opens and closes an opening 22b formed through the lower portion 22 of the case 20a.

The shutter 23 is made of a flexible plastic resin, and is installed through slots 21a and 22a formed through the upper and lower portions 21 and 22 of the case 20a so as to extend from an upper surface of the case to a lower surface in a form of a U-shaped stripe. In other words, one end of the shutter 23 is supported to be slidable by an upper guide plate 25a that is provided at the upper portion 21 of the case 20a, and the other end is inserted through the slots 21a and 22a, bent around the lower portion 22 of the case 20a, and supported to be slidable by a lower guide plate 25b provided at the lower portion 22 of the case 20a. Therefore, when the one end of the shutter 23 is moved toward the left, the other end of the shutter 23 is drawn and oppositely moved toward the right.

This structure is intended to enlarge a movable distance of the shutter 23 without widening a width Wa of the case 20a by making the shutter 23 with a flexible material and causing the shutter 23 to be foldable around the upper and lower surfaces of the upper and lower portions 21 and 22. That is, when a width Wb of the opening 22b is increased, a movable distance of the shutter 23 for opening/closing the opening 22b must also be increased in proportion to the width Wb of the opening 22b. However, with the slideable shutter 23 folded around the upper and lower surfaces of the case 20a, a movable distance of the shutter 23 required for opening/closing the opening 22b can be maintained without enlarging the width Wa of the case 20a. In other words, according to an embodiment of the present invention, the overall width Wa of the case 20a can be reduced to make a smaller disk cartridge while maintaining the same width Wb of the opening 22b for the pick-up 130 (FIG. 1) and the turntable 110 (FIG. 1) to have access to the disk D. Accordingly, the disk cartridge 20 satisfies the following relationship:

$$Wb \leq Wa - W1$$

where Wb is a width of the opening 22b, Wa is an overall width of the disk cartridge 20 and W1 is a remaining width of a portion of the shutter 23 which remains on the upper portion 21 of the case 20 as the shutter 23 fully closes the opening 22b.

Referring to FIG. 4, a shutter moving member 23a is fixed to a portion of the shutter 23 on the upper portion 21 of the case 20a so as to allow the shutter moving member 23a to engage with the opening lever 150 (FIG. 1) as the disk cartridge 20 is inserted into the recording/reproducing apparatus 100 (FIG. 1). A spring 24 provides the shutter 23 with an elastic force which acts in a direction for the shutter 23 to close the opening 22b.

Figure 5:
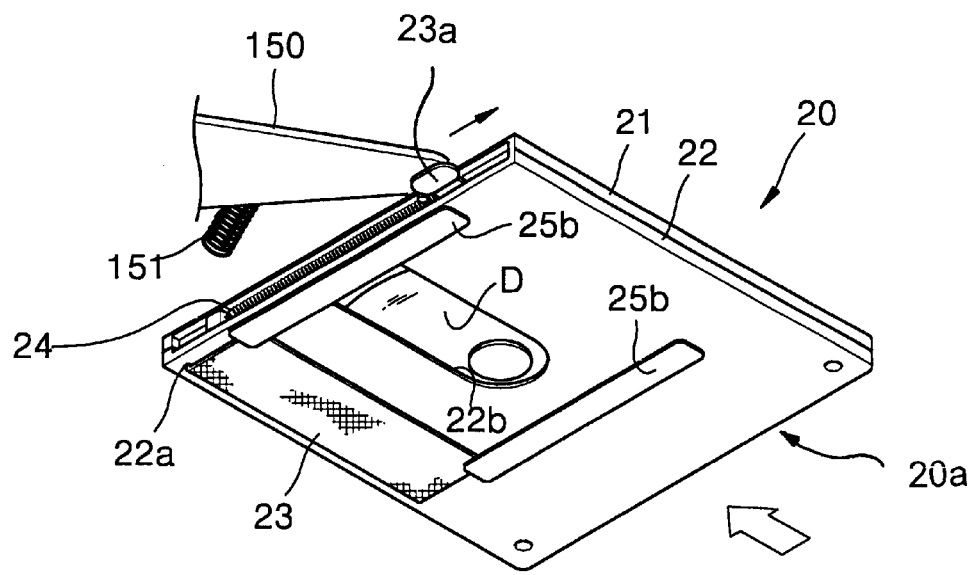
FIGS. 5 and 6 are perspective views illustrating procedures of opening and closing a shutter of the disk cartridge shown in FIG. 4.

FIG. 5 shows that as the disk cartridge 20 is seated on the tray 140 (FIG. 1), and is moved into the recording/reproducing apparatus 100 (FIG. 1), one end of the opening lever 150 moves one end portion of the shutter 23 supported on the upper portion 21 of the case 20a toward the right, while the one end of the opening lever 150 rotates and engages with the shutter moving member 23a of the shutter 23. Accordingly, the other end portion of the shutter 23, which closes the opening 22b of the lower portion 22 of the case 20a, is pulled, moves toward the left, and opens the opening 22b. Thereafter, the turntable 110 (FIG. 1) is attached to a clamping area of the disk D through the opened opening 22b, and the pick-up 130 (FIG. 1) records or reproduces information from the disk D through the opening 22b.

Figure 6:
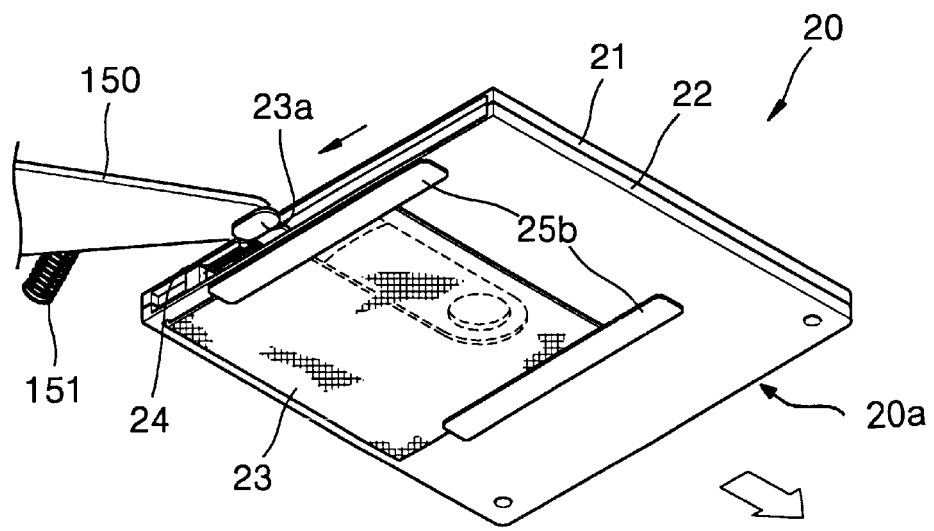

FIG. 6 shows that as the disk cartridge 20 is ejected from the recording/reproducing apparatus 100 (FIG. 1), the opening lever 150 and the shutter 23 are restored to their original positions due to an elastic restoring force of the spring 24. That is, the one end portion of the shutter 23 supported by the upper portion 21 of the case moves toward the left to its original position due to the elastic restoring force of the spring 24. In response, the other end portion of the shutter 23 supported by the lower portion 22 of the case 20a moves toward the right to close the opening 22b.

Accordingly, with a shutter structure of the present invention, the overall size of a disk cartridge can be reduced while maintaining the size of an opening the same as the size of an opening of a conventional disk cartridge. Therefore, a smaller sized disk cartridge can be produced without causing the smaller sized disk cartridge to lose compatibility with conventional recording/reproducing apparatuses. In addition, a shutter structure of the present invention provides for smooth opening and closing operations of an opening.

Figure 7:
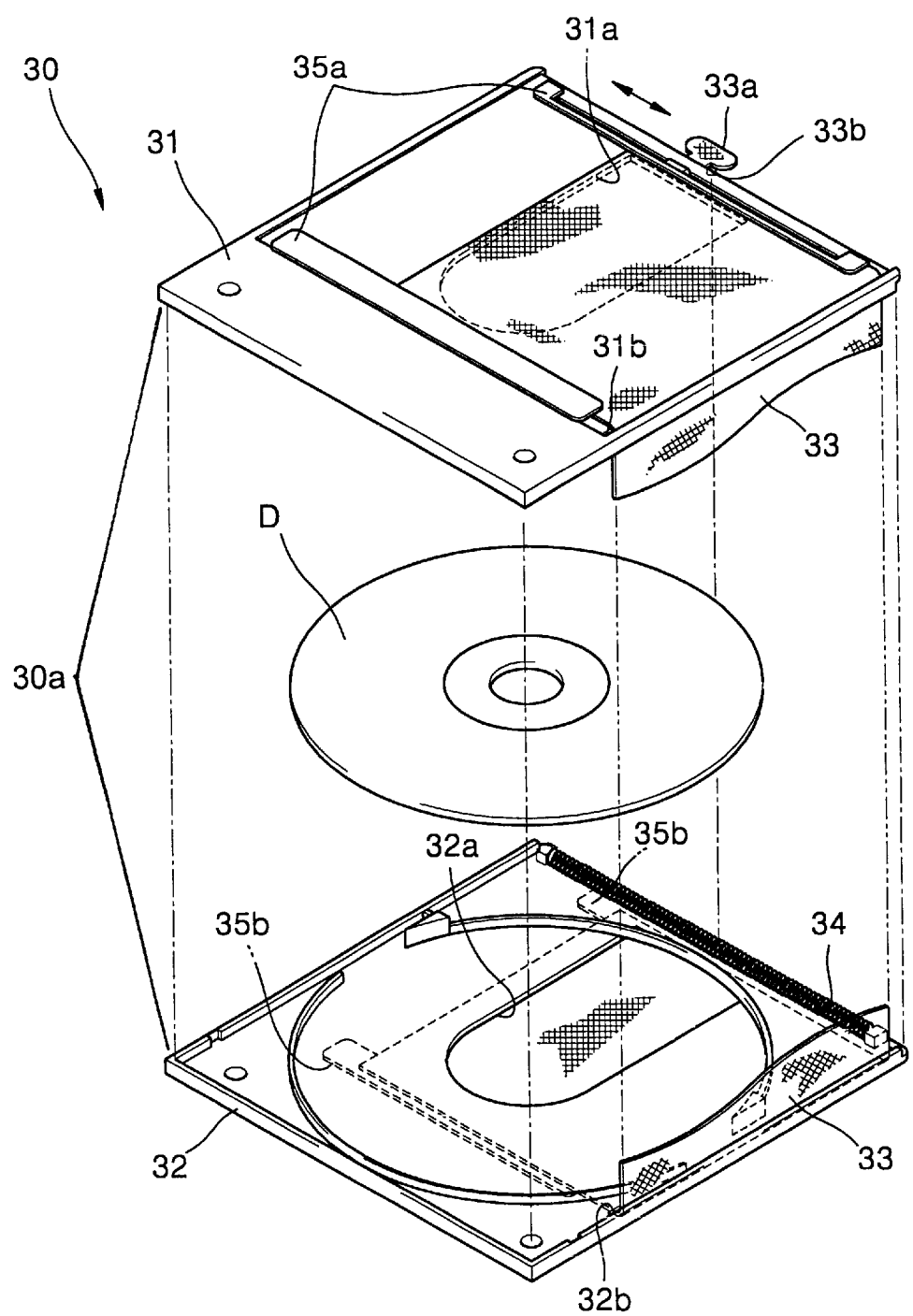
FIG. 7 is an exploded perspective view illustrating a disk cartridge according to another embodiment of the present invention.

FIG. 7 shows a disk cartridge 30 according to another embodiment of the present invention. In this embodiment, a flexible shutter configuration is applied to a double-sided disk cartridge. That is, the flexible shutter configuration can be applied to a disk cartridge containing a disk having either one recordable/reproducible side or two recordable/reproducible sides. In particular, a shutter mechanism of the present invention, as applied to a double-sided disk cartridge, lowers the possibility of dust entering into the double-sided disk cartridge as compared to a conventional shutter mechanism shown in FIG. 1 employed by an existing double-sided disk cartridge.

Referring to FIG. 7, a disk cartridge 30 includes a case 30a having upper and lower portions 31 and 32 which form a space for receiving a disk D, and a shutter 33 which selectively opens/closes openings 31a and 32a formed at the upper and lower portions 31 and 32 of the case 30a, respectively.

The shutter 33 is made of a flexible plastic resin, and is installed through slots 31b and 32b formed through the upper and lower portions 31 and 32 of the case 30a so as to extend from an upper surface of the case 30a to a lower surface in a form of a U-shaped stripe. In other words, one end portion of the shutter 33 covers the opening 31a of the upper portion 31, and the other end portion of the shutter 33 covers the opening 32a of the lower portion 32.

A shutter moving member 33a is fixed to a portion of the shutter 33 on the upper portion 31 of the case 30a so as to engage with the opening lever 150 (FIG. 1) as the disk cartridge 30 is inserted into the recording/reproducing apparatus 100 (FIG. 1). A spring 34 provides the shutter 33 with an elastic restoring force. An attachment piece 33b is attached to a center position of the spring 34, and subjects the shutter moving member 33a to an elastic force acting toward the center position. Upper and lower guide plates 35a and 35b support and allow the shutter 33 to slide back and forth from the upper and lower surfaces of the case 30a.

Figure 8:
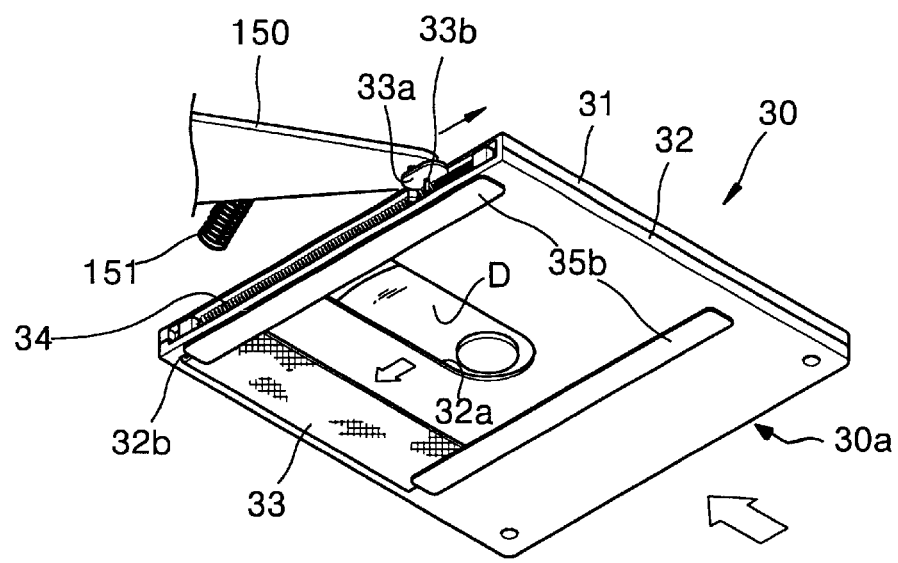
FIGS. 8 and 9 are perspective views illustrating procedures of opening and closing a shutter of the disk cartridge shown in FIG. 7.

FIG. 8 shows that as the disk cartridge 30 is inserted into the recording/reproducing apparatus 100 (FIG. 1), one end of the opening lever 150 moves one end portion of the shutter 33 supported by the upper portion 21 of the case 30a toward the right while the one end of the opening lever 150 rotates and engages with the shutter moving member 33a of the shutter 33. Accordingly, the other end portion of the shutter 33, which closes the opening 32a of the lower portion 32 of the case 30a, is pulled, moves toward the left, and opens the opening 32a. However, the opening 31a of the upper portion 31 of the case 30a, which is not used at this time, is closed by the shutter 33. Therefore, an inflow of dust through the opening 31a into the disk cartridge 30 can be prevented by the shutter 33. With an existing shutter structure shown in FIG. 1, both the opening 32a and the opening 31a would be opened even though the opening 31a is not currently in use. Accordingly, the possibility of dust entering into the disk cartridge 30 is high with a conventional shutter structure. In contrast, the shutter 33 of the present invention prevents dust from entering into the disk cartridge 30 because it closes an opening which is not in use. The shutter 33 is restored to its original position by the restoring force of the spring 34 as the disk cartridge 30 is ejected from the recording/reproducing apparatus 100 (FIG. 1).

Figure 9:
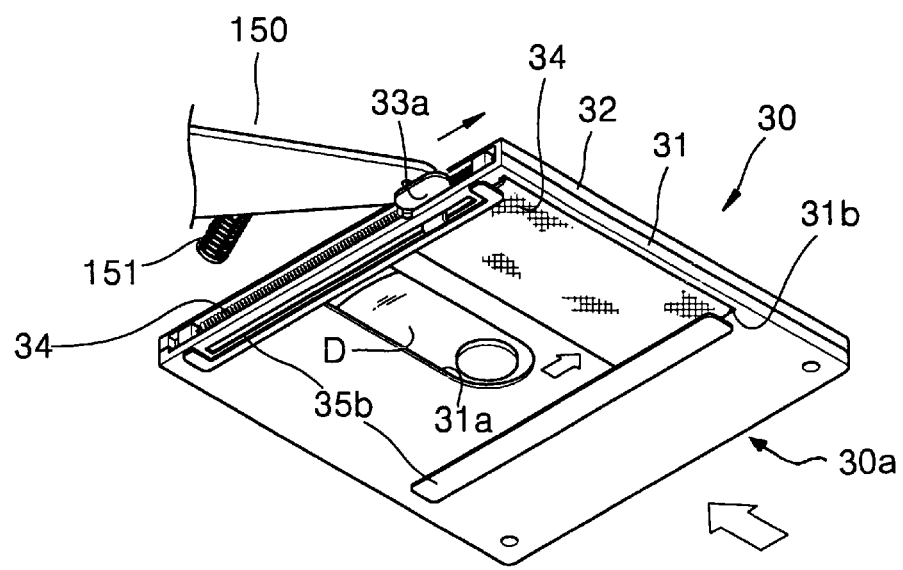

FIG. 9 shows that to change the disk D from one side to the other side, the disk cartridge 30 is rotated and inserted into the recording/reproducing apparatus 100 (FIG. 1) with the upper portion 31 facing the pick-up 130 (FIG. 1). The shutter moving member 33*a* of the shutter 33 engages with the opening lever 150 and moves toward the right even though the shutter moving member 33*a* has a slightly different height with respect to the opening lever 150.

In FIG. 8, the opening 32*a* of the lower portion 32 of the case 30*a* is opened as the shutter moving member 33*a* moves to the right and pulls the other end portion (a lower portion) of the shutter 33. In FIG. 9, the opening 31*a* of the upper portion 31 of the case 30*a* is opened as the shutter moving member 33*a* moves to the right and pushes the one end portion (an upper portion) of the shutter 33. The other end portion of the shutter 33 positioned at the lower portion 32 of the case 30*a* moves to the left and the opening 32*a* of the lower portion 32, which is not currently in use, remains closed.

A disk cartridge structure according to the present invention allows the size of a disk cartridge to be reduced while maintaining the size of an opening by making a shutter foldable around upper and lower surfaces of a case. In addition, applying the shutter of the present invention to a double-sided disk cartridge prevents an inflow of dust from entering into the double-sided disk cartridge because the shutter closes an opening, which is not in use, during a recording/reproducing operation.

What is claimed is:

1. A disk cartridge receiving a disk, comprising:
   a case for containing the disk; and
   a shutter having a predetermined length folded around upper and lower surfaces of the case, wherein the shutter selectively opens/closes at least one opening in the case as a portion of the shutter slides from one of the upper and lower surfaces to the other of the upper and lower surfaces.

2. The disk cartridge of claim 1, wherein the shutter is made of a flexible material.

3. The disk cartridge of claim 1, wherein the disk cartridge satisfies the following relationship:

$$Wb \leq Wa - W1$$

where Wb is a width of the one opening, Wa is an overall width of the disk cartridge and W1 is a remaining length of an upper portion of the shutter which remains on the upper surface of the case when the shutter closes the one opening fully.

4. The disk cartridge of claim 1, further comprising one or more guide plates formed to the case which support and guide the shutter.

5. The disk cartridge of claim 1, further comprising an elastic piece provided to the case which supplies a restoring force to the shutter.

6. The disk cartridge of claim 1, further comprising one or more slots formed to the case so as to allow the shutter to be folded around and have access to slide on the upper and lower surfaces of the case.

7. The disk cartridge of claim 1, further comprising a shutter moving member fixed to a section of the shutter which moves the shutter.

8. The disk cartridge of claim 1, wherein flexible material is a flexible plastic resin.

9. The disk cartridge of claim 1, wherein the at least one opening comprises first and second opening oppositely disposed on the case, wherein the shutter selectively opens the first opening while maintaining the second opening closed and selectively opens the second opening while maintaining the first opening closed, so as to prevent an inflow of a foreign matter into the case during a recording/reproducing operation.

10. The disk cartridge of claim 9, wherein the disk is a double-sided disk.

11. The disk cartridge of claim 10, wherein the shutter is made of a flexible material.

12. The disk cartridge of claim 11, further comprising as elastic piece provided to the case which supplies a restoring force to the shutter.

13. The disk cartridge of claim 12, further comprising:
   one or more guide plates formed to the case which support and guide the shutter;
   one or more slots formed to the case so as to allow the shutter to be folded around and have access to slide on the upper and lower surfaces of the case; and
   a shutter moving member fixed to a section of the shutter which moves the shutter.

14. The disk cartridge of claim 3, wherein the shutter is made of a flexible material.

15. The disk cartridge of claim 14, further comprising as elastic piece provided to the case which supplies a restoring force to the shutter.

16. The disk cartridge of claim 15, further comprising:
   one or more guide plates formed to the case which support and guide the shutter;
   one or more slots formed to the case so as to allow the shutter to be folded around and have access to slide on the upper and lower surfaces of the case; and
   a shutter moving member fixed to a section of the shutter which moves the shutter.

17. A disk cartridge receiving a disk, comprising:
   a case for containing the disk; and
   a shutter having an upper end member covering an upper surface of the case and a lower end member covering a lower surface of the case, wherein the shutter folds around the upper and lower surfaces of the case, and selectively opens/closes at least one opening in the case by sliding on the upper and lower surfaces of the case so as to change a surface area of the upper and lower end members covering the upper and lower surfaces of the case.

18. The disk cartridge of claim 17, wherein the at least one opening comprises first and second opening oppositely disposed on the case, wherein the shutter selectively opens the first opening while maintaining the second opening closed and selectively opens the second opening while maintaining the first opening closed, so as to prevent an inflow of a foreign matter into the case during a recording/reproducing operation.

19. A disk cartridge receiving a disk, comprising:
   a case for containing the disk; and
   a shutter having a predetermined length folded around upper and lower surfaces of the case, wherein the shutter selectively opens/closes at least one opening in the case by pulling a portion of the shutter covering the upper/lower surface of the case to the lower/upper surface of the case.

20. The disk cartridge of claim 19, wherein the at least one opening comprises first and second opening oppositely disposed on the case, wherein the shutter opens/closes the first opening which simultaneously closes/opens the second opening.

21. The disk cartridge of claim 19, wherein the at least one opening comprises first and second opening oppositely disposed on the case, wherein the shutter selectively opens the first opening while maintaining the second opening closed and selectively opens the second opening while maintaining the first opening closed, so as to prevent an inflow of a foreign matter into the case during a recording/reproducing operation.

22. A disk cartridge receiving a disk, comprising:
a case for containing the disk, wherein the case includes upper and lower surfaces, and first and second openings; and
a shutter which comprises a uniform member having an upper end covering the upper surface of the case and a lower end covering the lower surface of the case, wherein the shutter selectively opens the first opening while maintaining the second opening closed and selectively opens the second opening while maintaining the first opening closed by sliding on the upper and lower surfaces of the case so as to change a surface area of the upper and lower ends covering the upper and lower surfaces of the case.

23. The disk cartridge of claim 22, wherein the disk is a double-sided disk.

24. A disk cartridge receiving a disk, comprising:
a case for containing the disk; and
a shutter having an upper end member covering an upper surface of the case and a lower end member covering a lower surface of the case, wherein the upper end member slides in one direction and the lower end member simultaneously slides in the opposite direction to selectively open/close at least one opening in the case.

25. The disk cartridge of claim 24, wherein the at least one opening comprises first and second opening oppositely disposed on the case, wherein the shutter alternately opens and closes the first opening, and oppositely closes and opens the second opening so as to prevent an inflow of a foreign matter into the case during a recording/reproducing operation.

* * * * *